United States Patent [19]

Krauss

[11] 4,376,703
[45] Mar. 15, 1983

[54] OIL FILTER COVER

[76] Inventor: Leonard Krauss, 4204 Melisa Ct., Carmichael, Calif. 95608

[21] Appl. No.: 320,082

[22] Filed: Nov. 10, 1981

[51] Int. Cl.³ .......................................... B01D 27/00
[52] U.S. Cl. .................................... 210/238; 210/248; 210/541; 184/1.5; 220/85 H; 220/411; 220/DIG. 5; 222/108
[58] Field of Search ........................ 222/108; 184/1.5; 141/86, 88, 207; 123/196 A, 198 R; 220/85 H, 411, DIG. 5; 215/12 R, 100.5; 180/84; 137/614; 210/232, 238, 248, 168, 541, 542

[56] References Cited

U.S. PATENT DOCUMENTS

| 2,529,167 | 11/1950 | Lewis | 210/248 |
| 2,568,196 | 9/1951 | Kennedy | 210/248 |
| 2,948,452 | 8/1960 | Grogan | 215/100.5 |
| 3,257,025 | 6/1966 | Jolly | 220/85 H |
| 3,836,041 | 9/1974 | Allgeyer | 220/DIG. 5 |
| 3,973,549 | 8/1976 | Drummond | 123/198 R |
| 3,982,571 | 9/1976 | Fenton | 141/207 |
| 4,031,930 | 6/1977 | Sutcliffe | 141/207 |
| 4,214,614 | 7/1980 | Pyle | 137/614 |
| 4,276,162 | 6/1981 | Wilson | 210/248 |

Primary Examiner—Ernest G. Therkorn
Attorney, Agent, or Firm—Harvey B. Jacobson

[57] ABSTRACT

A cover for an oil filter in the form of a cup-shaped body or cover having a central opening for receiving an oil filter, a reservoir space formed between the cover and the oil filter, flexible spacers disposed between the inner surface of the cover and oil filter and a bellows or compressible series of accordion folds in the container surface. The folds urge closure of seals at opposite ends of the cover with their contacting elements. The body or oil filter cover may be constructed of heat resistant, flexible, resilient, transparent or translucent plastic material.

7 Claims, 6 Drawing Figures

U.S. Patent    Mar. 15, 1983    4,376,703
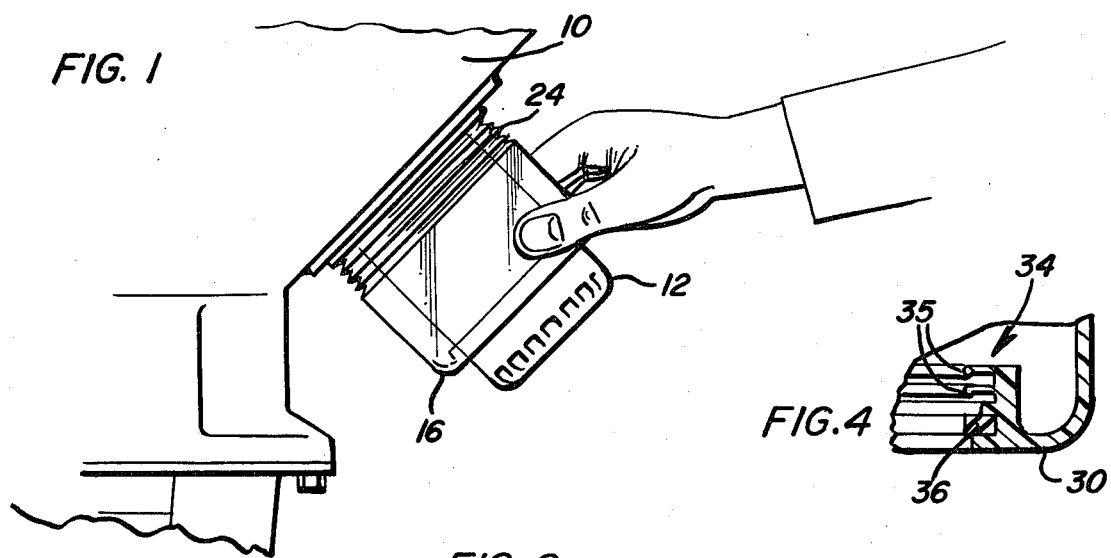
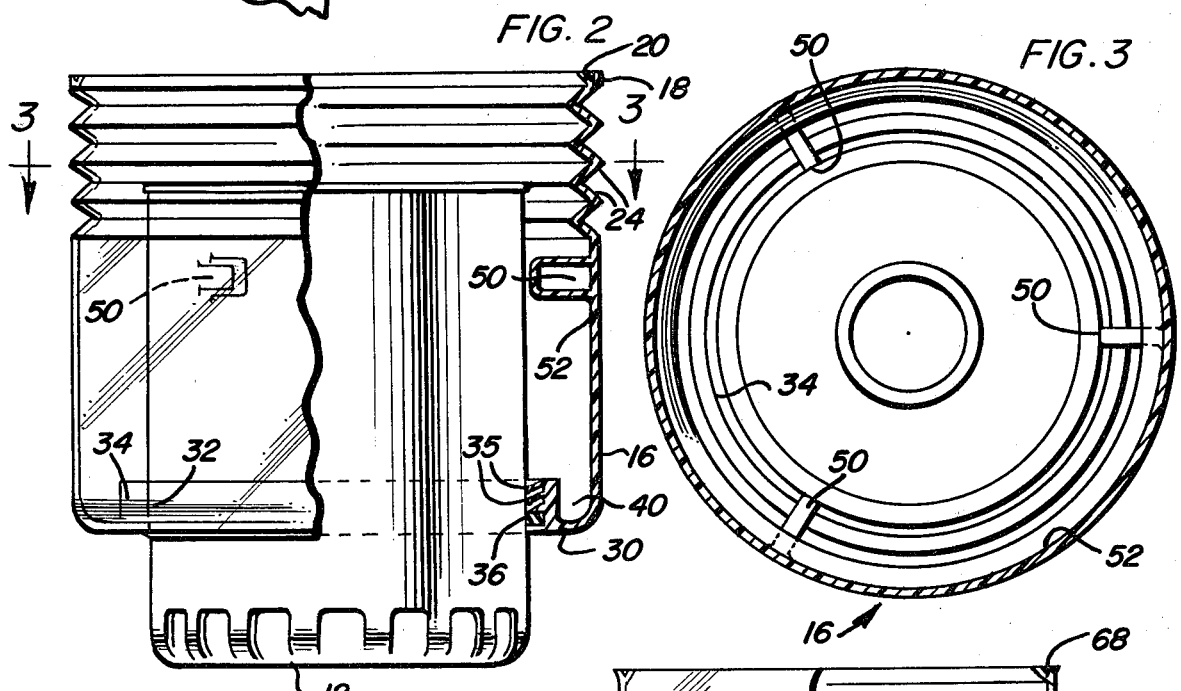
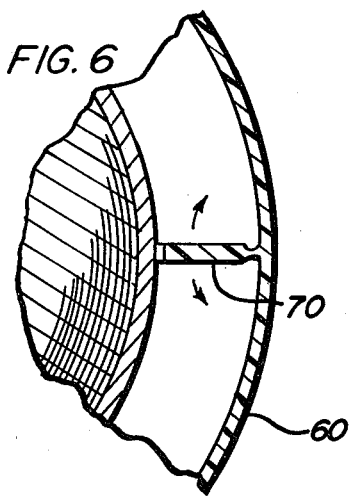
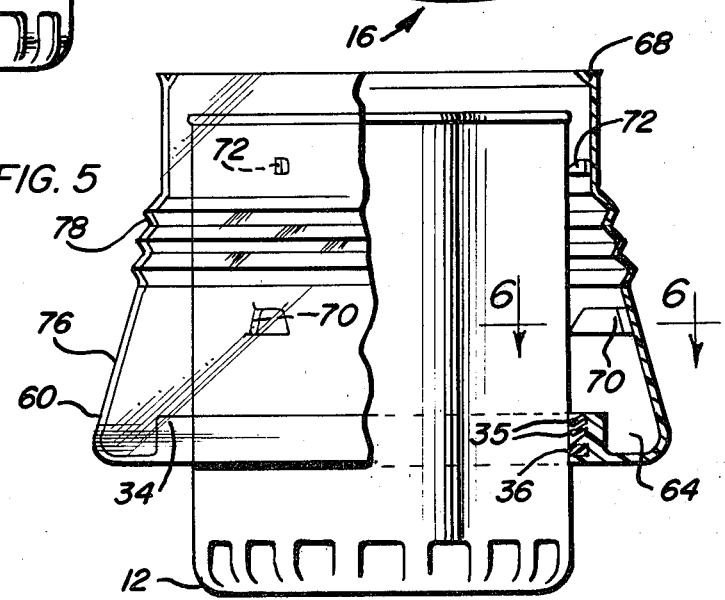

OIL FILTER COVER

BACKGROUND OF THE INVENTION

The present invention relates to an improved cover for providing a reservoir about an oil filter and for providing a cover to the oil filter that is securably attached to an internal combustion engine. More particularly, the oil filter cover provides a recess and reservoir for catching and holding excess and spilled oil therein when the oil filter is being removed for replacement. The cover is placed over a conventional oil filter when the oil filter is to be removed for catching and retaining used and dirty oil that drains from the engine and from the oil filter during the process of being removed for replacement.

The cover is provided with internal spacer members that provide a mechanism for fixing the relationship of the container with respect to the oil filter, the spacers being an integral part of the filter cover consisting of an inward extension from the body of the filter cover. The spacers are flexible so that there is always sufficient clearance between the oil filter cover and any adjacent engine components, and the spacers are adapted to being flexible or bent sufficiently enough to permit the filter cover to function as intended. The material forming the oil filter cover may be of a molded plastic that is heat-resistant, somewhat flexible and transparent or translucent so that it is capable of being observed whether there is oil spillage in the reservoir contained within the oil filter cover and whether the spillage is excessive so that there is provided an opportunity to use due care in removing the oil filter cover. The oil filter cover is disposable or it may be stored for subsequent placement on an oil filter when it is next to be removed.

Essentially, the oil filter cover is an open ended plastic tube preferably of transparent or translucent material having a smaller opening at another end thereof for receiving the oil filter therein which is to be removed. The inside diameter of the oil filter cover is generally greater than the diameter of the filters so that a reservoir or recess space is provided between the interior surface of the oil filter cover and the oil filter for catching and retaining excess oil spillage from the automotive oil filter that is being removed. Three or more spacers may be symmetrically disposed about the center axis of the oil filter cover for engaging in frictional relation the exterior surface of the oil filter, and a seal is provided at each of the openings of this oil filter cover. The seals may be of plastic, foam rubber, or other material such as contain or absorb oil. The oil filter cover may contain a compressible series of accordion folds that provide positive sealing function of the seals of the cover, particularly at the upper edge as it engages the surface of an internal combustion engine. During the process of removing an oil filter, the cover of the invention is first pushed over the oil filter sufficiently and enough to partially compress the bellows or accordion folds and such compression provides seal effect between the cover and where it contacts the engine as referred to above. The lower seal, that is where the cover encompasses the oil filter holds the cover sufficiently tight in place on the oil filter with ample space available for applying a filter wrench for removal of the oil filter. During loosening of the oil filter by the wrench, there may be some spillage of oil and during this process of unscrewing or loosening the oil filter, excess oil flows into the reservoir or recess space between the cover and the filter permitting the filter to be removed with a minimum spillage of oil and for a clean replacement oil filter to be installed accordingly.

DESCRIPTION OF THE PRIOR ART

The practice of installing and replacing oil filters has existed for many years for preserving and improving the use of internal combustion engines in automotive vehicles. While this has been a practice extending over some years, it appears that the features of the folowing U.S. patents relate to oil filters and leak-proof or oil drip prevention characteristics, and the patents as follows: U.S. Pat. No. 2,529,167 to F. Lewis et al., Nov. 7, 1950; U.S. Pat. No. 2,568,196 to W. V. Kennedy, Sept. 18, 1951; U.S. Pat. No. 3,973,549 to R. B. Drummond, Aug. 10, 1976; and U.S. Pat. No. 4,214,614 to W. R. Pyle, July 29, 1980.

The patent to Lewis discloses a leak-proof oil filter having an integrally formed oil reservoir designed to capture oil leaking past a sealing gasket. The patent to Kennedy discloses an oil filter mountable on an engine serving to collect oil that may leak out of a filter during normal operation or removal thereof. The patent to Drummond discloses an oil drip capturing container magnetically attached to an internal combustion engine, and the patent to Pyle discloses a vapor-recovery shroud in the form of a bellows positioned about a fuel dispensing nozzle, not otherwise relevant to the present invention. Comparing the features of these patents with that of the present invention, none of these patents, whether taken and viewed singly or in combination with each other are believed to have a bearing on the patent-ability of any claim of this invention.

SUMMARY OF THE INVENTION

An object and advantage of the present invention is to provide an oil filter cover constructed of low cost material that is disposable and usable during removal of an oil filter.

Another object of the invention is to provide a cover having an oil reservoir therein for accepting spillage of oil during the process of an oil filter being removed from its connection to an internal combustion engine and so that the oil spillage is contained within the cover. This prevents spillage of oil upon the internal combustion engine and other parts proximate to the engine and the supporting floor surface of the vehicle so that cleanliness is maintained and quick removal of oil caught in the reservoir of the cover is readily disposed of, the oil filter cover being disposable or cleaned for subsequent use.

Another object and advantage of the present invention is to provide a molded plastic oil filter cover that is heat resistant, somewhat flexible and also transparent or translucent for observing the amount of oil spillage received in the reservoir therein.

Another and additional object of the present invention is to provide spacers disposed within the oil filter cover being constructed of sufficient flexibility so that they maintain sufficient clearance between the cover or oil filter cover walls and oil filter, the spacers only being bent sufficiently enough for permitting the filter cover to function as intended.

A further and additional object of the present invention is to provide seal means that maintain oil flow integrity between the oil filter and the body or oil filter cover so that oil spillage is kept at a minimum and there is permitted removal of an oil filter to be replaced with a minimum loss or spillage of oil.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmental side elevational view of an internal combustion engine embodying an application of an oil filter cover of the present invention.

FIG. 2 is an enlarged side elevational view partly in section showing details of the oil filter cover in relation to the oil filter according to the invention.

FIG. 3 is a sectional view taken along lines 3—3 of FIG. 2.

FIG. 4 is an enlarged sectional view showing details of one of the seals of the cover for preferably engaging with the oil filter.

FIG. 5 is a side elevational view partly in section showing details of another embodiment of an oil filter cover arrangement according to the invention.

FIG. 6 is a sectional view taken along lines 6—6 of FIG. 5 showing a flexible spacer element.

DESCRIPTION OF THE PREFERRED EMBODIMENTS

Referring now to the drawings, there is shown that part of an internal combustion engine 10 to which is mounted in a conventional fashion an oil filter 12 of the spin-on type that accepts inflow of oil from the internal combustion engine in its conventional manner for filtering, cleansing and removing of foreign particles, and the like, and the cleansed or filtered oil of the oil filter 12 is then returned to the internal combustion engine. These details are not shown, but it is well known and the manner of securing the oil filter 12 by threaded means (not shown) is also well known. The process and practice of preventative maintenance for such internal combustion engines provides that after so long use or travel by the vehicle, the oil filter 12 is removed and a new one is installed. Due to the low position of installing the oil filter on the engine as shown in FIG. 1, a certain amount of leakage and spillage of oil occurs.

When the oil filter is desired to be removed and replaced, a cup-shaped body or oil filter cover 16 shown in FIGS. 1-3 is applied or inserted over the oil filter 12 until one end 18 terminating in a seal 20 engages against the internal combustion engine 10 by pushing or applying the cover 16 onto the oil filter 12. For urging the seal 20 against the internal combustion engine, there is provided a compressible series of accordion folds or bellows 24 constructed to additionally urge the seal 20 against the mating surface of the internal combustion engine. The material of the body is of a molded plastic material that is compressible, somewhat flexible and resilient as well as being heat resistant and transparent or translucent.

The other or lower end of the cup-shaped cover 16 terminates in an annular closure wall or surface 30 having a central or axial opening 32 and a seal structure 34 is provided including at least two resiliently bendable flanges 35 that engage tightly against a contacting surface of the oil filter 12. An O-ring 36 or similar sealing element with seal structure 34 maintains any oil that is collected in a recess 40 from being lost or spilled about and from the oil filter 12 and its cover 16. The recess 40 is defined as the space between the end wall 30 and the concentric or coaxial surfaces of the body 16 and the oil filter 12. As is shown in FIG. 3, a series of three spacer elements 50 are mounted projecting inwardly from the body wall 52 of the container 16 for engaging and spacing the oil filter coaxially from the cover 16 and maintaining this distance so that an annular space extends between the oil filter and the cover 16.

FIG. 4 shows an enlarged scale of the seal arrangement 32 which is also shown in elemental form in FIG. 3.

Another embodiment of an oil filter cover 60 is shown in FIGS. 5 and 6 in which the cover 60 is inserted over the oil filter 12, thus forming an annular truncated cone-shaped surface about a reservoir 64 shown within the cover 60. Similar seal arrangements 34, 35, 36 are provided for engaging between the cover 60 and the oil filter 12 as shown and described above with reference to FIGS. 2-4, and a seal 68 is disposed at the upper or open end of the cup-shaped cover for similarly engaging with the surface of the internal combustion engine as described with reference to seal 20. The cover 60 has more than one set of annular spacers along the surface of the cover 60 such as spacers 70, 72 between which there may be provided along the interior of a cone-shaped surface 76, a bellows 78 for maintaining a tight relation of the cover 60 onto the filter 12 as it is threadedly disengaged from the internal combustion engine as has been described above.

The cover 60 is placed on the oil filter when the filter is to be removed and it catches the dirty oil contents draining from the engine and from the old filter 12 being disengaged or removed from the internal combustion engine. A larger recess 64 provides for adequate retention of the spilled oil and the seals 34, 68 provide for preventing the oil being lost from the recess 64 since there is adequate space for containing the old oil as the oil filter 12 is displaced from its secured position.

After the oil filter is removed according to the teaching of the present invention and with the minimum loss of oil, a new filter may be installed on the engine and the cover that has just been removed is disposable or may be cleaned up, washed and held in storage for a later time when the oil filter is to be removed for replacement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a screw-on type oil filter including a generally cylindrical housing having first and second ends and including first threaded connecting means at said first end for threaded connection with and unthreading connection from an oil filter mounting location including second threaded connecting means to be threadingly engaged by said first threaded connecting means, an oil catching and retaining cover, said cover including a tubular body having first and second open ends and loosely telescopingly engaged over said filter from the second end thereof with said body first end spaced outward from said housing first end and said body second end disposed about an intermediate portion of said housing disposed between the first and second ends thereof, said body second end including a generally annular end wall partially closing said second end of said body, being disposed about said housing intermediate portion and including seal means frictionally engaging said intermediate portion and forming a reasonably good fluid tight seal between the inner periphery of said annular end wall and said housing intermediate portion, said housing being constructed of fluid impervious material and including a yieldingly axially compressable and integral bellows portion intermediate said annular end wall and said first body end, said body first end including axially outwardly facing seal means for forming a reasonably good fluid tight seal with said oil filter mounting location.

2. The combination of claim 1 wherein said tubular body includes inwardly projecting spacer elements disposed thereabout intermediate its opposite ends and engageable with opposing outer surfaces of said filter housing to maintain a spatial relation between said filter housing and said body.

3. The combination of claim 2 wherein said spacer elements are constructed of partially flexible material so as to be bendable in order to allow temporary reduction of the spatial relation between opposing peripheral portions of said housing and body.

4. The invention of claim 1 wherein said body includes a cylindrical contour throughout the length of its surface.

5. The invention of claim 1 wherein said body includes at least a portion of a truncated cone-shaped surface.

6. The invention of claim 5 wherein said bellows portion extends throughout at least the truncated cone-shaped surface.

7. The invention of claim 1 wherein said body is constructed of a heat-resistant, partially flexible and transparent material so that the container is secured in place on an internal combustion engine and any spillage of oil is discernable by an observer for determining oil spillage and collection within said reservoir.

* * * * *